Aug. 2, 1938.  B. V. HARRIS  2,125,781
SOLDER FEED FOR SOLDERING IRONS
Filed June 1, 1937
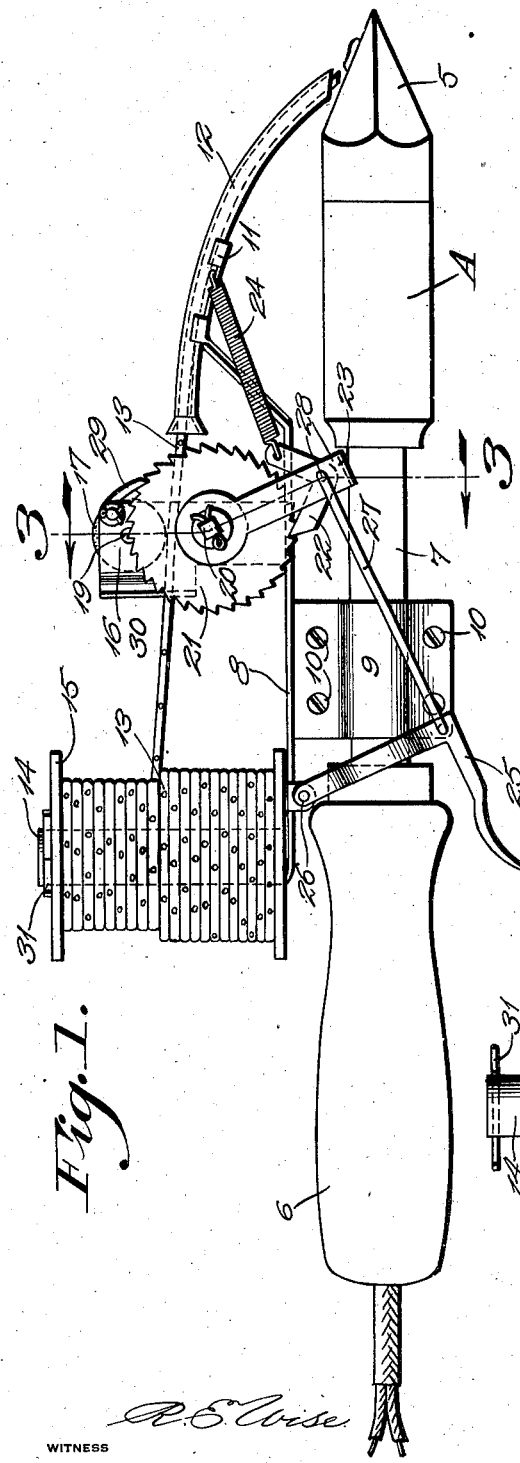
Burness V. Harris
INVENTOR Patented Aug. 2, 1938

2,125,781

UNITED STATES PATENT OFFICE 2,125,781

SOLDER FEED FOR SOLDERING IRONS

Burness V. Harris, Fort Sumner, N. Mex., assignor of one-half to Harry Hasskamp, Fort Sumner, N. Mex.

Application June 1, 1937, Serial No. 145,872

1 Claim. (Cl. 113—109)

The invention relates to a soldering iron attachment and more especially to a solder feeding device for soldering irons.

The primary object of the invention is the provision of a device of this character, wherein the same when carried by a soldering iron will enable the handling of the latter and the feeding of the solder thereto single handed thus freeing the other hand of a user, the device being of novel construction in its entirety and assuring a step by step feed of the solder during the use of the iron.

Another object of the invention is the provision of a device of this character, wherein the solder is fed to a soldering iron in a step by step manner through the action of a manually controlled trigger and a ratchet feed means operated thereby.

A further object of the invention is the provision of a device of this character, which is simple in construction, thoroughly reliable and efficient in operation, readily and easily applied to and removed from a soldering iron and when carried by the latter will assure a perfect feeding of solder to the iron, easy of operation, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a soldering iron showing the device constructed in accordance with the invention applied.

Figure 2 is a fragmentary top plan view of the device.

Figure 3 is a sectional view taken on the line 3—3 of Figure 1 looking in the direction of the arrows.

Similar reference characters indicate corresponding parts throughout the several views in the drawing.

Referring to the drawing in detail, A designates generally a soldering iron, in this instance of the electrically heated type, having as usual a pointed tip 5 at one end, a handle 6 at the other end and an intermediate shank 7, respectively, the iron being of conventional type.

The device constituting the present invention comprises a bracket formed with a relatively long support 8 having integral therewith a double jawed clamp, the jaws being indicated at 9 and accommodating nut carrying bolts 10 so that said clamp can be made fast upon the shank 7 for the mounting of the bracket upon the soldering iron A to have the support 8 spaced therefrom and in parallel relation to the shank. Formed at the foremost end of the support 8 is an outwardly bent hanger terminal 11 to which is fixed a forwardly and inwardly curved feeder tube or spout 12 through which is trained the acid or resin core solder 13 of the conventional strip or tape kind.

Formed on the support 8 at the rearmost end thereof is an outstanding journal 14 on which is rotatably fitted a spool or windlass 15 having normally wound thereon the solder 13 which in the feeding thereof is mechanically unwound from the said spool or windlass.

On the support 8 between the tube or spout 12 and the journal 14 and integral therewith are outwardly directed spaced parallel plate-like bearings 16 between which are arranged closely related rollers 17 and 18, respectively, the former being a guide and the latter a power roller, and accommodating the solder 13 therebetween for the mechanical feeding of such solder by the said power roller 18. The axle 19 for the roller 17 is suitably journaled in the bearings 16 while the axle 20 is also suitably journaled in said bearings 16 and outside with respect to said bearings 16 this axle 20 has fixed thereto a ratchet wheel 21 with which coacts a ratchet dog 22 supported in a substantially U-shaped swinging arm loosely fitted with said axle 20.

The dog 22 has connected thereto a coiled tensioning spring 24 which is suitably connected with the terminal hanger 11 and functions to effect ratchet action of the dog 22 in cooperation with the ratchet wheel 21 so that the power roller 18 will be effective for a step by step feeding of the solder 13 through the tube or spout 12 onto the tip 5 of the iron A.

Rearwardly of the arm 23 is a control trigger 25 pivoted at 26 to the support 8 and loosely connected with this trigger 25 is a link 27 which has its end 28 pivoted in the arm 23 and also forming the pivot for the dog 22. By operating the trigger 25 the solder 13 will be fed through the tube or spout 12 and unwound from the spool or windlass 15, the feeding of the solder being in a step by step manner through ratchet coaction between the dog 22 and ratchet wheel 21.

Swingingly carried by one of the bearings 16 is a latching pawl 29 coacting with the ratchet wheel 21 to check back movement of the ratchet wheel when the latter through the dog 22 and trigger 25 is operated for the feeding of the solder.

The bearings 16 are formed with inwardly struck guide wings or cheeks 30 for the solder 13 and thus action upon the latter for centering it between the rollers 17 and 18 during feeding thereof.

The spool or windlass 15 is held on the journal 14 by a releasable cotter pin 31 removably fitted in said journal.

The fasteners 10 allow the releasing of the jaws 9 of the clamp from the shank 7 of the iron A for detachment of the device therefrom or for the fastening of the device on said iron.

It is to be understood that the roller 17 which constitutes the guide roller for the solder is preferably made from rubber although it may be made from any other suitable material if found desirable.

What is claimed is:

A solder feeder device for a soldering iron comprising a separable clamp for fastening to the iron and having a relatively long support provided with an outwardly bent hanger terminal at the foremost end thereof, an inwardly curved feeder tube on said terminal for the training of strip or tape solder therethrough and directing it to a tip of the iron, an outstanding journal at the other end of the support and disposed at right angles to the longitudinal axis of said iron, a strip or tape solder-carrying spool rotatably fitting the journal for the delivery of strip or tape solder to the tube, spaced outstanding bearings on said support between the tube and spool, closely arranged related rollers journaled in said bearings and having the strip or tape solder passing therebetween, a ratchet wheel for driving one of the rollers and disposed at one side of the support, a substantially U-shaped swinging arm loose about the axis of said wheel and in suspended relation thereto, a ratchet dog pivoted in said arm for ratchet action upon the wheel, a spring connected with the terminal and said dog for holding it in ratchet acting position and also for exerting a pull upon the arm in one direction, an oscillatory trigger swingingly suspended from said support in close relation to the iron, and a link connecting the trigger and the said arm.

BURNESS V. HARRIS.